(12) United States Patent
Hatton

(10) Patent No.: US 11,524,813 B2
(45) Date of Patent: Dec. 13, 2022

(54) MOUNTING PLATE FOR FIXED, TRACK, AND SWIVELING CASTERS

(71) Applicant: PENN ELCOM LTD., Washington Tyne And Wear (GB)

(72) Inventor: James Hatton, East Sussex (GB)

(73) Assignee: PENN ELCOM LTD., Washington (GB)

( * ) Notice: Subject to any disclaimer, the term of this patent is extended or adjusted under 35 U.S.C. 154(b) by 44 days.

(21) Appl. No.: 17/046,742

(22) PCT Filed: Apr. 3, 2019

(86) PCT No.: PCT/EP2019/058340
§ 371 (c)(1),
(2) Date: Oct. 9, 2020

(87) PCT Pub. No.: WO2019/197228
PCT Pub. Date: Oct. 17, 2019

(65) Prior Publication Data
US 2021/0163178 A1 Jun. 3, 2021

(30) Foreign Application Priority Data
Apr. 9, 2018 (DE) .................. 20 2018 101 915.5

(51) Int. Cl.
*B60B 33/00* (2006.01)
*B65D 19/42* (2006.01)
*B65D 19/06* (2006.01)

(52) U.S. Cl.
CPC .............. *B65D 19/42* (2013.01); *B60B 33/00* (2013.01); *B65D 19/06* (2013.01); *B65D 2519/00273* (2013.01); *B65D 2519/00781* (2013.01)

(58) Field of Classification Search
CPC .................. B60B 33/0002; B60B 33/0005
(Continued)

(56) References Cited

U.S. PATENT DOCUMENTS 3,526,921 A * 9/1970 Aupkejeana ........... A45C 5/143
16/38
4,683,097 A 7/1987 Hand et al.
(Continued)

FOREIGN PATENT DOCUMENTS

CN 103496492 A 1/2014
DE 2312477 A1 9/1974
(Continued)

OTHER PUBLICATIONS

International Search Report of PCT/EP2019/058340, dated Jun. 27, 2019.

*Primary Examiner* — Jacob K Ackun
(74) *Attorney, Agent, or Firm* — Dickinson Wright PLLC

(57) ABSTRACT

A transport container, featuring a bottom plate with at least two holes for accommodating means of attachment for affixing fixed, track, or swiveling casters, a plate (1) affixed from the inside to the bottom plate for affixing fixed, track, or swiveling casters on the bottom plate of the transport container. The mounting plate (1) features a base plate (2) with a contact surface (1*a*), which faces the inside of the transport container in its assembled state, for placement onto the transport container. At least two means of insertion (3) are evenly distributed along the perimeter of the base plate (2), which protrude with an insertion area (7) from the contact surface (1*a*) of the base plate (2) and which each respectively feature an internal thread (5) and/or an external thread for affixing of the fixed, track, and swiveling casters in or on the insertion area (7), wherein the means of insertion (3) are disposed in the holes of the bottom plate.

9 Claims, 2 Drawing Sheets

(58) Field of Classification Search
USPC .......................... 16/38, 39, 31 R; 280/79.11
See application file for complete search history.

(56) References Cited

U.S. PATENT DOCUMENTS

| | | | | |
|---|---|---|---|---|
| 4,719,664 | A * | 1/1988 | Berfield | .............. B60B 33/0002 |
| | | | | 16/38 |
| 6,293,569 | B1 * | 9/2001 | Ferre | ........................ A45C 5/14 |
| | | | | 280/DIG. 3 |
| 6,931,692 | B2 * | 8/2005 | Guttmann | ........... B60B 33/0018 |
| | | | | 16/21 |
| 8,549,705 | B1 * | 10/2013 | Wu | ..................... B60B 33/0028 |
| | | | | 16/45 |
| 2004/0093688 | A1 * | 5/2004 | Lucht | ................. B60B 33/0073 |
| | | | | 16/38 |
| 2016/0031264 | A1 * | 2/2016 | Bruno | .................. B60B 33/006 |
| | | | | 16/39 |

FOREIGN PATENT DOCUMENTS

| | | |
|---|---|---|
| DE | 2318889 A1 | 10/1974 |
| DE | 8331946 U1 | 7/1984 |
| DE | 3341464 A1 | 5/1985 |

* cited by examiner

MOUNTING PLATE FOR FIXED, TRACK, AND SWIVELING CASTERS

CROSS-REFERENCE TO RELATED APPLICATIONS

This application is a 35 U.S.C. § 371 national phase of PCT International Application No. PCT/EP2019/058340, filed Apr. 3, 2019, which claims the benefit of priority under 35 U.S.C. § 119 to German Patent Application No. 20 2018 101 915.5, filed Apr. 9, 2018, the contents of which are incorporated herein by reference in their entirety.

FIELD OF THE INVENTION

The invention relates to a transport container comprising a base plate with at least two holes for receiving fastening means for affixing fixed, track or swiveling casters with a pre-installed mounting plate for affixing the fixed, track, and swiveling casters.

BACKGROUND

In the construction of transport containers, fixed casters or track and swiveling casters are most often affixed with the help of captive nuts. These captive nuts are pre-installed in holes in the bottom plate, so that the casters can be affixed by means of screws when they are being mounted. The casters themselves normally have their own mounting plate with clearance holes, through which the screws can be inserted and screwed into the captive nuts. When screwing in the screws, the problem often arises that the captive nuts either come loose, turn along with the screws, or are pre-installed at an angle.

A pallet for transporting goods is known from CN 103 496 492 A. This rectangular pallet has a support base at each corner with a deep threaded hole for mounting a roller. Each caster is fixed by a screw connection in a mounting section of the corresponding support base and is vertically adjustable by screwing it into the hole.

An upright rack for the transport of goods is known from U.S. Pat. No. 4,683,097 A. This revealed upright rack has a plastic molded pallet and legs molded to the bottom of the pallet. During the forming of the upright rack, caster supports are permanently fixed in a form-fitted manner to the ends of the legs, above which rollers are attached to the legs by means of threaded engagement.

DE 83 31 946 U1 discloses a cardboard box, in the bottom of which a plate with support bases is integrated, with the plate being inserted between folded bottom elements in pre-punched holes. The assembly is complex and the load capacity of the folding carton is very limited.

DE 33 41 464 A1 also discloses a cardboard box. This cardboard box is connected to a pallet arranged under the cardboard box by means of through holes arranged in base elements of the cardboard box and fastening bolts inserted in these holes, the pallet having a support plate with hollow feet for support.

DE 23 18 889 A1 discloses a stackable frame for storing groupage loads, whereby the rollers can be attached to the base of the frame by bolting from below.

The object of the present invention is to avoid the existing disadvantages in mounting fixed, track, and swiveling casters on a transport container and to reduce the effort required for mounting.

SUMMARY

The above expressed object is achieved according to the invention through the features described herein. In that the transport container features a bottom plate with at least two holes for accommodating the means of insertion for affixing fixed, track, or swiveling casters and a mounting plate according to the invention is affixed from the inside to the bottom plate, wherein the mounting plate features a base plate with a contact surface for placement onto the transport container, which faces the transport container in its assembled state, wherein at least two means of insertion are evenly distributed along the perimeter of the base plate, which respectively exhibit an internal thread and/or an external thread for affixing the fixed, track, and swiveling casters on or in an insertion area of the means of insertion which protrudes from the contact surface of the base plate. The means of insertion are fixed in the mounting holes of the base plate in a force-fitted and/or material-bonded manner, wherein the means of insertion are disposed in the holes in the bottom plate, the captive nuts known from the prior art are replaced. The means of insertion are inserted into the holes intended for the captive nuts in the bottom plate of the transport container. An angled positioning of the threads in relation to each other and mutual rotation of the threads is thereby avoided. Additionally, the installation of the means of attachment on the transport container is reduced to a single installation step, namely the installation of the mounting plate.

Additional advantageous designs of the invention are indicated in the following figure descriptions and the dependent subordinate claims.

In the various figures of the illustration, identical parts are always marked with the same reference numerals.

DETAILED DESCRIPTION

For the following description note that the invention is not restricted to the exemplary embodiments and therefore not to all or multiple features of the described feature combinations; furthermore, every individual partial feature of each and every design example is also meaningful for the object of the invention separately from all other partial features described in combination, and also in combination with any features of another exemplary embodiment.

Figure 1:
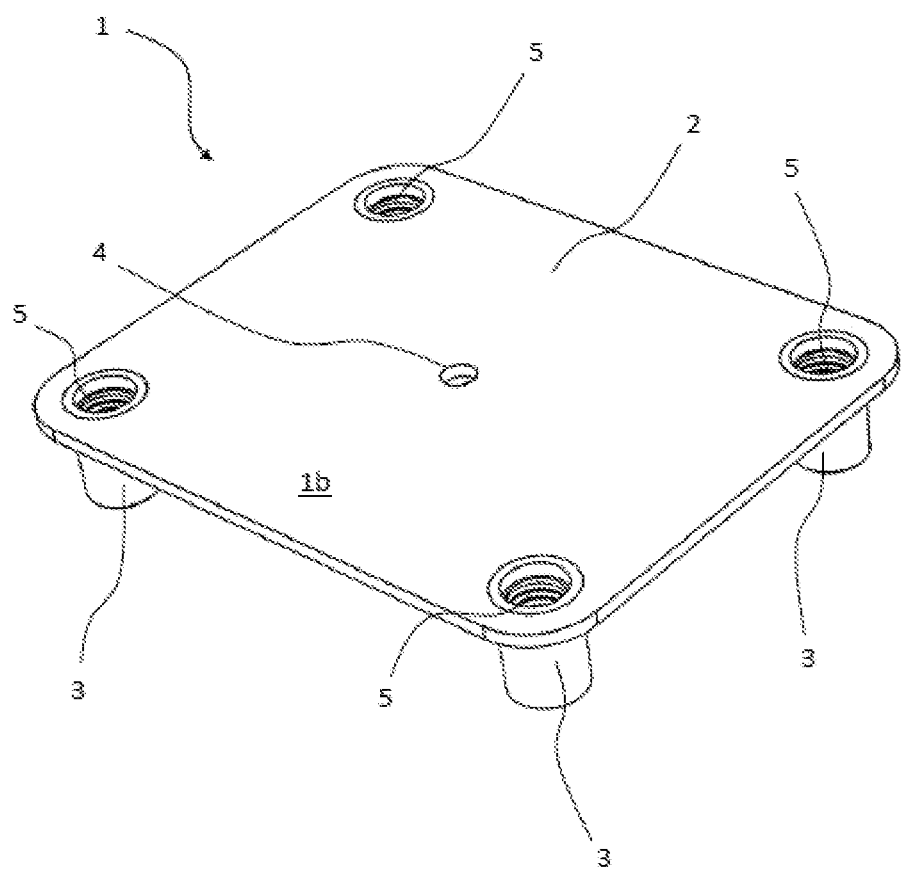
FIG. 1 is a view of an uninstalled mounting plate according to the invention.
Figure 3:
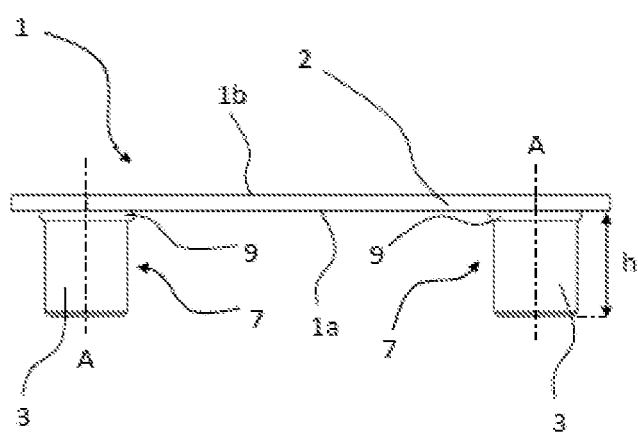
FIG. 3 is a side view of an uninstalled mounting plate according to the invention.

FIG. 1 depicts a three-dimensional view of a mounting plate 1 according to the invention. The mounting plate 1 can be mounted from the inside to a bottom plate of a transport container (not-shown). The mounting plate 1 features a base plate 2 with a contact surface 1a shown in FIG. 3), which faces the inside of the transport container in its assembled state, for placement onto the transport container. Preferably, the mounting plate 1 features a rectangular surface, in particular with rounded corners. The mounting plate 1 is thereby adapted in a particularly advantageous manner to the corners of the bottom plate or the internal space of the transport container.

Figure 2:
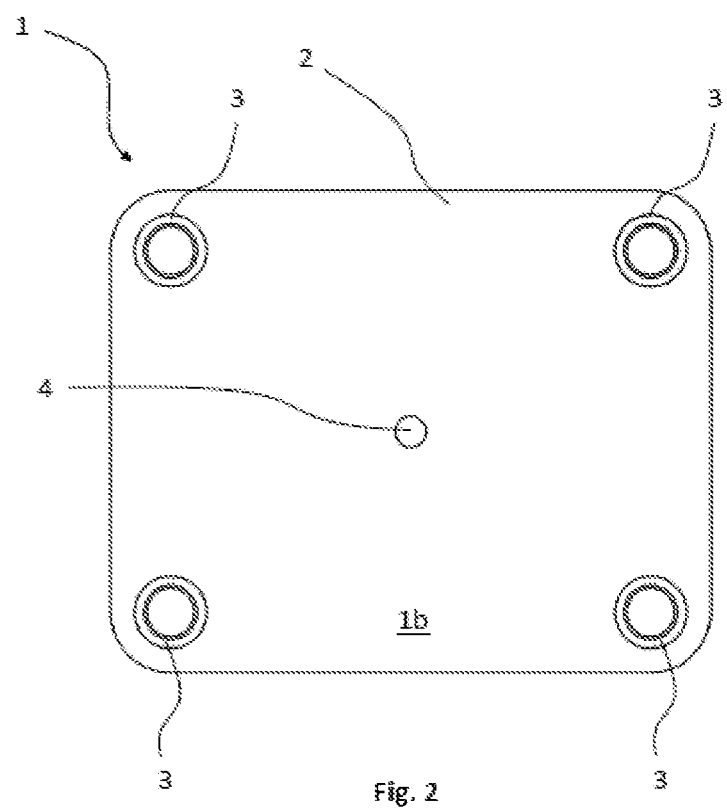
FIG. 2 is a top view of an uninstalled mounting plate according to the invention.

FIG. 2 shows a top view of the rear surface 1b of the mounting plate 1, which lies opposite the contact surface 1a. The mounting plate 1 additionally features at least two, preferably four, means of insertion (sleeves) 3 distributed evenly along the perimeter of the base plate 2, in particular in the corner areas of the mounting plate 1. The means of insertion 3 protrude from the base plate 2 with their axis A, as show in FIG. 3, at a right angle to their respective insertion area 7.

In the design embodiment shown, the means of insertion 3 are designed as sleeves and each respectively features an internal thread 5 with a screw-in opening on the free end of the insertion area 7 for the mounting of a (not-shown) fixed, track, or swiveling caster by means of a screw. In particular, the means of insertion 3 designed as sleeves can, alternatively or additionally, each respectively feature an external thread (not-shown) on the insertion area, so that the fixed, track, or swiveling casters can also be mounted by means of a nut.

In an alternate design embodiment (not shown), the means of insertion 3 are designed as bolts and each respectively features an external thread on the insertion area 7.

Preferably the screw-in openings of the sleeves 3 are designed as being flush with the rear surface 1b of the base plate 2. In one potential design embodiment, the means of insertion 3 designed as sleeves are closed with a base plate on the opposite end from the screw-in opening. This prevents the ingress of dirt and/or moisture into the transport container before a fixed, track, or swiveling caster is mounted, or in the event that sleeves with nuts are used for affixing the fixed, track, or swiveling casters. In an alternative design embodiment, the means of insertion 3 designed as sleeves are designed as being open on the opposite end from the screw-in opening. This provides a certain tolerance concerning the screw-in depth of the screws for affixing the fixed, track, or swiveling casters.

The outer diameters of the means of insertion 3 are adapted to the inner diameters of the holes in the bottom plate of the transport container such that the means of insertion 3 can be inserted into the holes of the bottom plate. Preferably the height h (see FIG. 3) of the means of insertion 3 is thereby smaller than or equal in size to the thickness of the bottom plate of the transport container, so that the means of insertion do not protrude from the outer wall of the transport container.

Alternatively, the height h (see FIG. 3) of the means of insertion 3 is designed as larger than the thickness of the bottom plate of the transport container. This is necessary in particular in the case of means of insertion 3 designed as sleeves or bolts with external threads. In the case of sleeves with internal threads as well, the protruding portion of the means of insertion 3 can be compensated by means of a spacer plate, wherein the protruding part of the means of insertion can serve as a centering aid.

Furthermore, it is advantageous that the outer diameter of the means of insertion 3 be dimensioned such that the sleeves 3 can be seated in the holes in the bottom plate in friction-locking manner. Thus the means of insertion 3 also constitute a retaining means for the mounting plate 1 in the transport container. This enables a particularly easy installation of the mounting plate 1 without additional affixing means, wherein the mounting plate is retained in the holes during the manufacture of the transport container.

The mounting plate 1 advantageously features a hole 4 disposed in the center of the base plate 2 for accommodating a means of attachment, for example a self-tapping screw or a rivet, for the purpose of affixing the base plate 2 on the transport container. The hole 4 is preferably countersunk along its entire circumference in the mounting surface 1b. This makes possible a flat mounting surface 1b of the mounting plate when a countersunk screw or a rivet is used.

By affixing the mounting plate 1 on the bottom plate, the mounting, exchange, and unmounting of fixed, track, or swiveling casters is made easier and prevents the mounting plate 1 from coming loose from the transport container when exchanging the fixed, track, and swiveling casters.

In one design embodiment of the mounting plate 1, receiving holes are disposed in the base plate 2 for the means of insertion 3, wherein the means of insertion 3 are affixed in the receiving holes in a friction-locking and/or materially-bonded manner, in particular being introduced from the direction of the contact surface 1a. In particular, the means of insertion 3 are designed as press-fit sleeves. The press-fit sleeves thereby feature a ring collar 9 on their outer diameter to serve as a press-in stop. It is hereby preferable that the bottom plate of the transport container features recesses around the circumferences of the holes in the bottom plate which receive the ring collar 9.

The base plate 2 is made in particular of metal or plastic. In particular the means of insertion 3 can be connected to the base plate 2 in a materially-bonded manner. In an additional design embodiment, the base plate 2 along with the means of insertion 3 can be designed as a single molded piece.

In an assembly which is not shown, consisting of a transport container and mounting plate 1, mounting plates 1 according to the invention are pre-installed in the corners of the bottom plate of the transport container, wherein the means of insertion 3 are disposed in the holes of the bottom plate. The pre-installed assembly reduces the effort required for mounting the fixed, track, or swiveling casters in the final assembly.

The invention is not limited to the depicted and described design examples, but rather encompasses all designs of equivalent function in the sense of the invention. It is explicitly noted that the design examples are not limited to all individual features in combination, but rather each individual feature can be meaningful to the invention independently of all other individual features. Furthermore, the invention has hitherto not been restricted to the combination of features as claimed, but rather can also be defined by any other desired combination of features of all of the features described in total. This means that in essence practically every individual feature of claims can be omitted or replaced by at least one other feature described elsewhere in this application.

The invention claimed is:

1. A mounting plate for a transport container featuring a bottom plate with at least two holes for accommodating a means of attachment for affixing fixed, track, or swiveling casters, the mounting plate adapted to be affixed from an inside to the transport container to the bottom plate, the mounting plate comprising
   a base plate with a contact surface, which is adapted to face the inside of the transport container in an assembled state, for placement onto the transport container,
   wherein the base plate is provided with mounting holes for means of insertion,
   wherein at least two of the means of insertion are evenly distributed along the perimeter of the base plate, which protrude with an insertion area from the contact surface of the base plate and which each respectively feature an internal thread and an external thread for affixing of the fixed, track, and swiveling casters in or on the insertion area,
   wherein the means of insertion are fixed in the mounting holes of the base plate in a force or a material-bonded manner, wherein the means of insertion are disposed in the holes of the bottom plate of the transport container.

2. The mounting plate according to claim 1, further comprising the mounting plate is designed to be rectangular in shape and features four of the means of insertion which each respectively are disposed in corner areas of the mounting plate.

3. The mounting plate according to claim 1, further comprising the means of insertion are designed as sleeves with an internal thread disposed in the insertion area.

4. The mounting plate according to claim 1, further comprising the means of insertion are designed as sleeves with an external thread disposed in the insertion area.

5. The mounting plate according to claim 1, further comprising the sleeves are designed as being open on an opposite end from an end forming the screw-in opening.

6. The mounting plate according to claim 1, further comprising the means of insertion are designed as bolts with the external thread disposed in the insertion area.

7. The mounting plate according to claim 1, further comprising a centrally disposed hole in the base plate for receiving a means of attachment for affixing the base plate to the transport container.

8. The mounting plate according to claim 7, further comprising in that the hole is countersunk along its entire circumference in the mounting surface.

9. The mounting plate according to claim 1, further comprising in that an inner diameter of the holes in the bottom plate and an outer diameter of the means of insertion are dimensioned such that the means of insertion can be seated in the holes in the bottom plate in a friction-locking manner.

* * * * *

UNITED STATES PATENT AND TRADEMARK OFFICE
CERTIFICATE OF CORRECTION

| | | |
|---|---|---|
| PATENT NO. | : 11,524,813 B2 | |
| APPLICATION NO. | : 17/046742 | |
| DATED | : December 13, 2022 | |
| INVENTOR(S) | : James Hatton | |

It is certified that error appears in the above-identified patent and that said Letters Patent is hereby corrected as shown below:

In the Claims

Column 4, Claim 1, Line 61, replace "and" with --or--

Signed and Sealed this
Eighteenth Day of July, 2023

Katherine Kelly Vidal
*Director of the United States Patent and Trademark Office*